United States Patent [19]
Hobbs

[11] Patent Number: 6,104,385
[45] Date of Patent: Aug. 15, 2000

[54] COMPUTER KEYBOARD

[76] Inventor: William D. Hobbs, 37 McNab Lane, P.O. Box 25, Burgessville, Ontario, Canada, N0J-1C0

[21] Appl. No.: 09/048,677

[22] Filed: Mar. 26, 1998

[51] Int. Cl.[7] .................. G09G 5/00; B41J 5/08
[52] U.S. Cl. .......................... 345/168; 400/489
[58] Field of Search .................. 345/168–172; 400/127, 489; 341/20–26

[56] References Cited

U.S. PATENT DOCUMENTS 5,543,790   8/1996   Goldstein ................... 341/22
5,669,722   9/1997   Overthun et al. ........... 400/489

Primary Examiner—Mark R. Powell
Assistant Examiner—Thu Nguyen

[57] ABSTRACT

A new computer keyboard for allowing users to customize the positioning of their keyboards. The inventive device includes first and second keypads each having an upper surface, front and back ends and a pair of sides extending between the front and back ends. The upper surface of each of the keypads has a plurality of keys on it. In each side of each of the keypads is a socket. Each of the ends of an elongate connector cable is insertable into a socket of each of the keypads such that the connector cable electrically connects the first keypad to the second keypad.

9 Claims, 2 Drawing Sheets

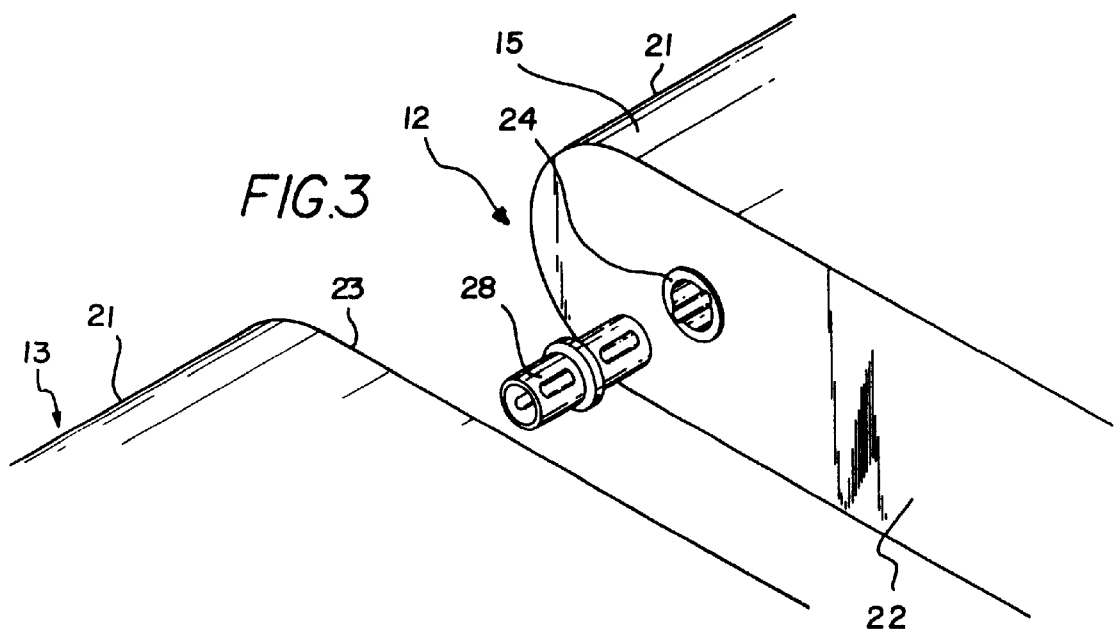
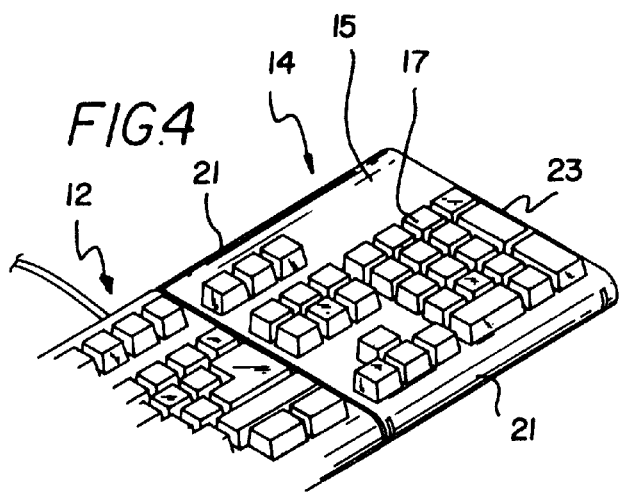

COMPUTER KEYBOARD

BACKGROUND OF THE INVENTION

1. Field of the Invention

The present invention relates to computer keyboards and more particularly pertains to a new computer keyboard for allowing users to customize the positioning of their keyboards.

2. Description of the Prior Art

The use of computer keyboards is known in the prior art. More specifically, computer keyboards heretofore devised and utilized are known to consist basically of familiar, expected and obvious structural configurations, notwithstanding the myriad of designs encompassed by the crowded prior art which have been developed for the fulfillment of countless objectives and requirements.

Known prior art computer keyboards include U.S. Pat. No. 5,410,333; U.S. Pat. No. 5,122,786; U.S. Pat. No. 5,119,078; U.S. Pat. No. 5,067,834; U.S. Pat. No. 4,661,005; and U.S. Pat. No. Des. 345,152.

While these devices fulfill their respective, particular objectives and requirements, the aforementioned patents do not disclose a new computer keyboard. The inventive device includes first and second keypads each having an upper surface, front and back ends and a pair of sides extending between the front and back ends. The upper surface of each of the keypads has a plurality of keys on it. In each side of each of the keypads is a socket. Each of the ends of an elongate connector cable is insertable into a socket of each of the keypads such that the connector cable electrically connects the first keypad to the second keypad.

In these respects, the computer keyboard according to the present invention substantially departs from the conventional concepts and designs of the prior art, and in so doing provides an apparatus primarily developed for the purpose of allowing users to customize the positioning of their keyboards.

SUMMARY OF THE INVENTION

In view of the foregoing disadvantages inherent in the known types of computer keyboards now present in the prior art, the present invention provides a new computer keyboard construction wherein the same can be utilized for allowing users to customize the positioning of their keyboards.

The general purpose of the present invention, which will be described subsequently in greater detail, is to provide a new computer keyboard apparatus and method which has many of the advantages of the computer keyboards mentioned heretofore and many novel features that result in a new computer keyboard which is not anticipated, rendered obvious, suggested, or even implied by any of the prior art computer keyboards, either alone or in any combination thereof.

To attain this, the present invention generally comprises first and second keypads each having an upper surface, front and back ends and a pair of sides extending between the front and back ends. The upper surface of each of the keypads has a plurality of keys on it. In each side of each of the keypads is a socket. Each of the ends of an elongate connector cable is insertable into a socket of each of the keypads such that the connector cable electrically connects the first keypad to the second keypad.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new computer keyboard apparatus and method which has many of the advantages of the computer keyboards mentioned heretofore and many novel features that result in a new computer keyboard which is not anticipated, rendered obvious, suggested, or even implied by any of the prior art computer keyboards, either alone or in any combination thereof.

It is another object of the present invention to provide a new computer keyboard which may be easily and efficiently manufactured and marketed.

It is a further object of the present invention to provide a new computer keyboard which is of a durable and reliable construction.

An even further object of the present invention is to provide a new computer keyboard which is susceptible of a low cost of manufacture with regard to both materials and labor, and which accordingly is then susceptible of low prices of sale to the consuming public, thereby making such computer keyboard economically available to the buying public.

Still yet another object of the present invention is to provide a new computer keyboard which provides in the apparatuses and methods of the prior art some of the advantages thereof, while simultaneously overcoming some of the disadvantages normally associated therewith.

Still another object of the present invention is to provide a new computer keyboard for allowing users to customize the positioning of their keyboards.

Yet another object of the present invention is to provide a new computer keyboard which includes first and second keypads each having an upper surface, front and back ends and a pair of sides extending between the front and back ends. The upper surface of each of the keypads has a plurality of keys on it. In each side of each of the keypads is a socket. Each of the ends of an elongate connector cable is insertable into a socket of each of the keypads such that the connector cable electrically connects the first keypad to the second keypad.

Still yet another object of the present invention is to provide a new computer keyboard that may be positioned horizontally and vertically to accommodate all comfort preferences.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic partial perspective view of the present invention with the connector plug.

FIG. 4 is a schematic partial perspective view of the present invention showing the third numeric keypad.

DESCRIPTION OF THE PREFERRED EMBODIMENT

Figure 1:
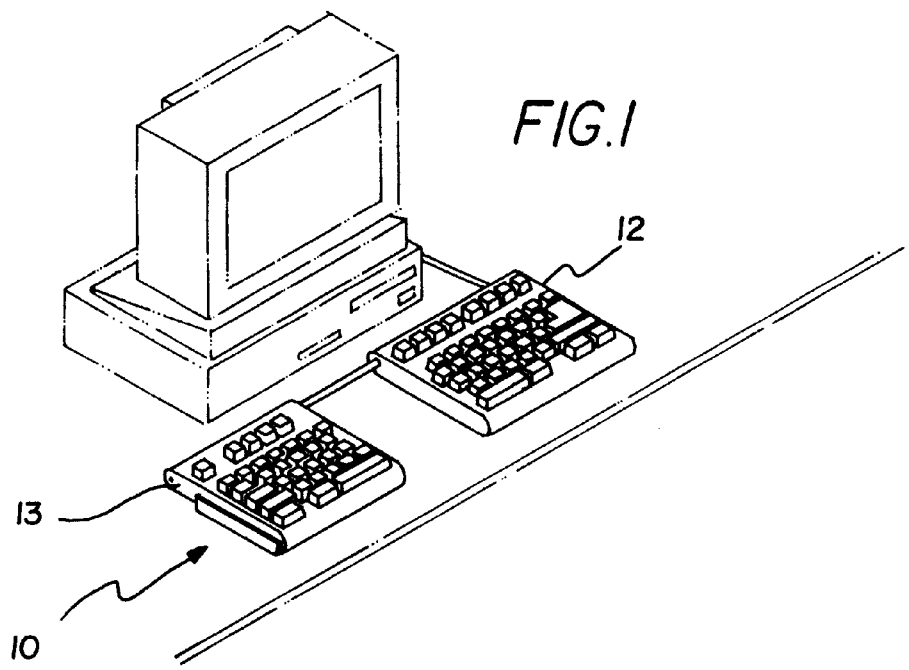
FIG. 1 is a schematic perspective view of a new computer keyboard in use connected to a computer according to the present invention.

With reference now to the drawings, and in particular to FIGS. 1 through 4 thereof, a new computer keyboard embodying the principles and concepts of the present invention and generally designated by the reference numeral 10 will be described.

As best illustrated in FIGS. 1 through 4, the computer keyboard 10 generally comprises first and second keypads 12,13 each having an upper surface 15, front and back ends 20,21 and a pair of sides 22,23 extending between the front and back ends 20,21. The upper surface 15 of each of the keypads has a plurality of keys 16 on it. In each side 22,23 of each of the keypads 12,13 is a socket 24. Each of the ends of an elongate connector cable 26 is insertable into a socket 24 of each of the keypads 12,13 such that the connector cable 26 electrically connects the first keypad 12 to the second keypad 13.

Figure 2:
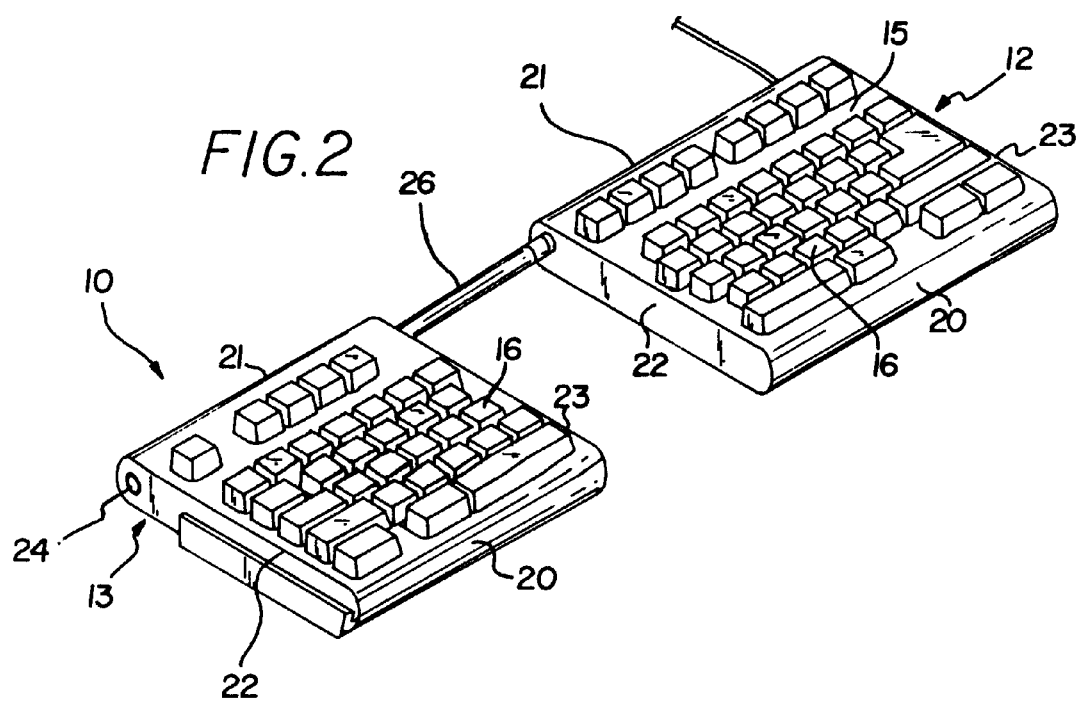
FIG. 2 is a schematic perspective view of the present invention.

Specifically, the keyboard 10 has separable first and second keypads 12,13 each with an upper surface 15, a lower surface, front and back ends 20,21 and a pair of sides 22,23 extending between the front and back ends 20,21. As illustrated in FIG. 2, the keypads are ideally generally rectangular. The upper surface 15 of each of the keypads 12,13 has a plurality of keys 16 thereon. As illustrated in FIGS. 2 and 3, each side 22,23 of each keypad 12,13 has a socket 24. Preferably, the sockets 24 are positioned towards the back end 21 of its respective keypad 12,13.

At least one elongate connector cable 26 is provided to connect the keypads together. The connector cable is preferably flexible and has a pair of opposite ends. Each of the ends of the connector cable 26 is insertable into a socket 24 of the keypads 12,13. For example as illustrate in FIG. 2, one of the ends of the connector cable 26 is removably inserted into a socket 24 of the first keypad 12 while another of the ends of the connector cable 26 is removably inserted into a socket 24 of the second keypad 13 to electrically connect the first keypad to the second keypad.

Optionally, a connector plug 28 instead of a connector cable 26 may be used to connect keypads. The connector plug 28 has a pair of ends which are each insertable into a socket 24 of the keypads. As illustrated in FIGS. 3 and 4, the connector plug 28 is designed for insertion into sockets 24 of adjacent sides 22,23 of the first and second keypads 12,13 when one side of the first keypad is positioned adjacent one side of the second keypad to electrically connect the adjacent keypads together.

In an ideal embodiment of the keyboard, a third keypad 14 is included. The third keypad 14, like the first and second keypads, has an upper surface 15, front and back ends 20,21 and a pair of sides 22,23 extending between the front and back ends 20,21. The upper surface 15 of the third keypad 14 has a plurality of keys thereon. Preferably, the keys of the third keypad 14 comprise a numeric keypad 17. Like the other keypads 12,13, each side of the third keypad 14 has a socket 24 positioned towards the back end of the third keypad 14. The third keypad 14 is electrically connectable to either of the other keypads 12,13 by using another connector cable 26 or another connector plug inserted into the respective sockets of the third keypad and the other keypad in the same manner as the other keypads.

In use, the keyboard 10 is electrically connectable to a computer by a cable or other connecting means. Preferably, the first keypad is electrically connectable to a computer by the cable. When using the connector cable, the connected keypads are spaced apart from each other by the length of the connector cable. If the connector cable is flexible, then the keypads may be positioned in various positions with respect to one another to suit the needs of a user. When a standard keyboard is desired, the keypads are positioned together and a connector plug is used to connect the sockets of adjacent sides of the keypads together.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A keyboard electrically connectable to a computer, comprising:

first and second keypads each having an upper surface and an outer perimeter comprising front and back ends and inner and outer sides extending between said front and back ends, said upper surface of each of said keypads having a plurality of parallel rows of keys thereon, said inner sides of said keypads facing each other in a substantially parallel relationship;

each inner side of each keypad having a socket;

an elongate connector cable having a pair of opposite ends, each of said ends of said connector cable being insertable into a socket of said keypads such that said connector cable electrically connects said first keypad to said second keypad wherein insertion of said connector cable in said sockets permits positioning of the inner sides of said keypads in a spaced, parallel orientation with respect to each other; and a connector plug having a pair of ends, each of said ends of said connector plug being insertable into a socket of said keypads, said connector plug being for insertion into sockets of adjacent sides of said first and second keypads when one side of said first keypad is positioned adjacent one side of said second keypad to electrically connect said adjacent keypads together, said connector plug holding said first and second keypads in a fixed position with respect to another to prevent pivoting of said first and second keypads with respect to one another at a pivot axis positioned between said back inner corners of said first and second keypads;

wherein each of said sockets of said of said keypads has at least one longitudinal groove therein, wherein said connector plug has a spaced apart pair of longitudinal ridges extending therefrom, one of said ridges being positioned adjacent one of said ends of said connector plug and the other of said ridges being positioned adjacent the other of said ends of said connector plug, and said longitudinal groove of said first keypad receiving one of said ridges of said connector plug and said longitudinal groove of said second keypad receiving the other of said ridges of said connector plug to hold said first and second keypads against rotation with respect to one another about an axis extending parallel to said back edges of said first and second keypads.

2. The keyboard of claim 1, wherein said sockets are positioned towards said back end of its respective keypad.

3. The keyboard of claim 1, wherein said connector cable is flexible.

4. The keyboard of claim 1, wherein one of said ends of said connector cable is inserted into a socket of said first keypad, another of said ends of said connector cable is inserted into a socket of said second keypad.

5. The keyboard of claim 1, further comprising a third keypad having an upper surface, front and back ends and a pair of sides extending between said front and back ends;

said upper surface of said third keypads having a plurality of keys thereon;

each side of said third keypad having a socket, said sockets being positioned towards said back end of said third keypad; and another said connector cable having one end inserted into a socket of said third keypad and another end inserted into a socket of another keypad such that said third keypad is electrically connectable to said another keypad.

6. The keyboard of claim 5, wherein said keys of said third keypad comprise a numeric keypad.

7. The keyboard of claim 1, wherein each of said first and second keypads has a back inner corner formed adjacent to the back end and the inner side of the respective keypad, and wherein said socket of each of said keypads is located adjacent to said back inner corner.

8. The keyboard of claim 1, wherein the rows of keys of each keypad are oriented perpendicularly to the inner edge of the respective keypad such that when said inner sides of said keypads are parallel to each other, the rows of keys of the keypads are parallel.

9. A keyboard electrically connectable to a computer, comprising;

first and second keypads each having an upper surface, and a generally rectangular outer perimeter comprising substantially parallel front and back ends and a pair of substantially parallel sides extending between said front and back ends of the respective keypad, said sides of each keypad being extended substantially perpendicular to said front and back ends of the respective keypad;

said first and second keypads each having a front inner corner formed between said front and an inner side of said pair of sides of the respective keypad and a back inner corner formed between said back and said inner side of the respective keypad;

said inner sides of said keypads facing one another and being spaced apart from one another in a substantially parallel relationship to one another;

said upper surface of each of said keypads having a plurality of keys thereon;

each side of each keypad having a socket, said sockets being positioned towards said back end of its respective keypad;

an elongate connector cable being flexible and having a pair of opposite ends, each of said ends of said connector cable being insertable into a socket of said keypads, one of said ends of said connector cable being inserted into a socket of said first keypad, another of said ends of said connector cable being inserted into a socket of said second keypad, said connector cable electrically connecting said first keypad to said second keypad;

a connector plug having a pair of ends, each of said ends of said connector plug being insertable into a socket of said keypads, said connector plug being for insertion into sockets of adjacent inner sides of said first and second keypads when said inner side of said first keypad is positioned adjacent said inner side of said second keypad to electrically connect said adjacent keypads together;

said connector plug holding said first and second keypads in a fixed position with respect to another to prevent pivoting of said first and second keypads with respect to one another at an axis positioned between said back inner corners of said first and second keypads;

wherein each of said sockets of said of said keypads has at least one longitudinal groove therein;

wherein said connector plug has a spaced apart pair of longitudinal ridges extending therefrom, one of said ridges being positioned adjacent one of said ends of said connector plug and the other of said ridges being positioned adjacent the other of said ends of said connector plug;

said longitudinal groove of said first keypad receiving one of said ridges of said connector plug and said longitudinal groove of said second keypad receiving the other of said ridges of said connector plug to hold said first and second keypads against rotation with respect to one another about an axis extending parallel to said back edges of said first and second keypads;

said connector having an annular lip extending therearound between said longitudinal ridges of said connector plug;

said annular lip having an outer diameter greater than and outer diameter of said sockets;

a third keypad having an upper surface, and a generally rectangular outer perimeter comprising front and back ends and a pair of sides extending between said front and back ends;

said upper surface of said third keypads having a plurality of keys thereon, wherein said keys of said third keypad comprise a numeric keypad;

each side of said third keypad having a socket, said sockets being positioned towards said back end of said third keypad; and another said connector cable having one end inserted into a socket of said third keypad and another end inserted into a socket of another keypad such that said third keypad is electrically connectable to said another keypad.

* * * * *